US011006362B2

United States Patent
Cheng et al.

(10) Patent No.: US 11,006,362 B2
(45) Date of Patent: May 11, 2021

(54) APPRATUS AND METHOD FOR BEAM FAILURE RECOVERY IN A WIRELESS COMMUNICATION SYSTEM

(71) Applicant: FG Innovation Company Limited, Tuen Mun (HK)

(72) Inventors: Yu-Hsin Cheng, Hsinchu (TW); Hung-Chen Chen, Hsinchu (TW); Chie-Ming Chou, Hsinchu (TW)

(73) Assignee: FG Innovation Company Limited, Tuen Mun (HK)

( * ) Notice: Subject to any disclaimer, the term of this patent is extended or adjusted under 35 U.S.C. 154(b) by 31 days.

(21) Appl. No.: 16/190,159

(22) Filed: Nov. 14, 2018

(65) Prior Publication Data
US 2019/0166555 A1 May 30, 2019

Related U.S. Application Data

(60) Provisional application No. 62/590,382, filed on Nov. 24, 2017.

(51) Int. Cl.
*H04W 72/04* (2009.01)
*H04W 72/08* (2009.01)
(Continued)

(52) U.S. Cl.
CPC .......... *H04W 52/0216* (2013.01); *H04B 1/74* (2013.01); *H04W 36/0088* (2013.01);
(Continued)

(58) Field of Classification Search
CPC . H04W 74/0833; H04W 16/14; H04W 36/06; H04L 1/0026
See application file for complete search history.

(56) References Cited

U.S. PATENT DOCUMENTS

2018/0192384 A1\* 7/2018 Chou .................... H04W 24/10
2019/0081691 A1\* 3/2019 Nagaraja .............. H04B 17/309
(Continued)

FOREIGN PATENT DOCUMENTS

| CN | 102075441 A | 5/2011 |
| WO | 2016127403 A | 8/2016 |
| WO | 2017024516 A | 2/2017 |

OTHER PUBLICATIONS

Samsung RAN1 agreements based beam recovery procedure, R2-1713797 3GPP TSG-RAN WG2 2017 RAN2#100 Meeting Nov. 17, 2017(Nov. 17, 2017) section 2.
(Continued)

*Primary Examiner* — Iqbal Zaidi
(74) *Attorney, Agent, or Firm* — ScienBiziP, P.C.

(57) ABSTRACT

A method for beam failure recovery in a wireless communication system is provided. The wireless communication system includes a UE and a base station. The method includes the following actions. A first BWP configuration, a second BWP configuration and a BWP inactivity timer are received by the UE from the base station. The UE is configured to be switched from a first BWP to a second BWP when the BWP inactivity timer expires, and the first BWP corresponds to the first BWP configuration and the second BWP corresponds to the second BWP configuration. Whether a beam failure recovery procedure is triggered is determined by the UE. The BWP inactivity timer is stopped by the UE when the beam failure recovery procedure is triggered.

20 Claims, 7 Drawing Sheets

(51) Int. Cl.
*H04W 72/14* (2009.01)
*H04W 36/06* (2009.01)
*H04W 36/30* (2009.01)
*H04W 72/02* (2009.01)
*H04W 52/02* (2009.01)
*H04W 36/00* (2009.01)
*H04W 76/18* (2018.01)
*H04B 1/74* (2006.01)

(52) U.S. Cl.
CPC ..... *H04W 72/0446* (2013.01); *H04W 72/085* (2013.01); *H04W 72/14* (2013.01); *H04W 76/18* (2018.02); *H04W 36/06* (2013.01); *H04W 36/305* (2018.08); *H04W 72/02* (2013.01)

(56) References Cited

U.S. PATENT DOCUMENTS

2019/0132109 A1* 5/2019 Zhou ................ H04W 74/0841
2020/0037332 A1* 1/2020 da Silva ............... H04L 5/0023

OTHER PUBLICATIONS

LG Electronics Inc. Summary of E-mail discussion on [99bis#43][NR UP/MAC] Impact of BWP, R2-1713879 3GPP TSG-RAN WG2 Meeting #100 Nov. 17, 2017(Nov. 17, 2017) section 2.2.
AT&T Remaining Details on Mechanisms to Recover from Beam Failure, R1-1719633 3GPP TSG RAN WG1 Meeting 91 Nov. 18, 2017(Nov. 18, 2017) sections 1 and 3.

* cited by examiner

APPRATUS AND METHOD FOR BEAM FAILURE RECOVERY IN A WIRELESS COMMUNICATION SYSTEM

CROSS-REFERENCE TO RELATED APPLICATION(S)

The present application claims the benefit of and priority to a provisional U.S. Patent Application Ser. No. 62/590,382 filed on Nov. 24, 2017 entitled "Method and Apparatus for Beam Failure Detection and Recovery in BWP operation", which is hereby incorporated fully by reference into the present application.

FIELD

The present disclosure generally relates to wireless communication methods, and more particularly, apparatus and method for beam failure recovery in a wireless communication system.

BACKGROUND

In fifth generation (5G) new radio (NR) wireless communication system, the bandwidth part (BWP) has been introduced in NR to solve the problem that UEs may not require to operate with wide system bandwidth defined in the 5G NR system. Moreover, BWP can also support power saving for the UE by scheduling the UE to smaller BWP. Specifically, a BWP inactivity timer is configured to UE. Once the BWP inactivity timer expires, the UE automatically fallbacks to a default BWP. This timer will be restarted if UE successfully decoded a downlink control information (DCI) to schedule PDSCH in the active BWP. In addition, a beam failure recovery procedure has been introduced in 5G NR wireless communication system to enable the UE recover from temporary signal quality degradation without trigger a radio link failure (RLF) procedure and an RRC reestablishment. Since there are timers designed for the beam failure recovery procedure, the interaction between the BWP switching and the beam failure recovery procedure should be well designed to avoid BWP mis-alignment between the BS and the UE.

SUMMARY

The present disclosure is directed to apparatus and method for beam failure recovery in a wireless communication system.

In one aspect of the present disclosure, a method for beam failure recovery in a wireless communication system is provided. The wireless communication system includes a UE and a base station. The method includes the following actions. A first BWP configuration, a second BWP configuration and a BWP inactivity timer are received by the UE from the base station. The UE is configured to be switched from a first BWP to a second BWP when the BWP inactivity timer expires, and the first BWP corresponds to the first BWP configuration and the second BWP corresponds to the second BWP configuration. Whether a beam failure recovery procedure is triggered is determined by the UE. The BWP inactivity timer is stopped by the UE when the beam failure recovery procedure is triggered.

In another aspect of the present disclosure, a UE is provided. The UE includes a processor configured to perform the following instructions. A first BWP configuration, a second BWP configuration and a BWP inactivity timer are received from the base station. The processor is configured to be switched from a first BWP to a second BWP when the BWP inactivity timer expires, and the first BWP corresponds to the first BWP configuration and the second BWP corresponds to the second BWP configuration. Whether a beam failure recovery procedure is triggered is determined. The BWP inactivity timer is stopped when the beam failure recovery procedure is triggered.

In yet another aspect of the present disclosure, a method for beam failure recovery in a wireless communication system is provided. The wireless communication system includes a UE and a base station. The method includes the following actions. A first BWP configuration, a second BWP configuration and a BWP inactivity timer are transmitted by the base station to the UE. Whether a partial beam failure recovery procedure or a full beam failure recovery procedure is triggered is identified by the base station in response to the beam failure recovery request. A beam management procedure is triggered by the base station when the partial beam failure recovery procedure is triggered.

In yet another aspect of the present disclosure, a base station is provided. The base station includes a processor configured to perform the following instructions. A first BWP configuration, a second BWP configuration and a BWP inactivity timer are transmitted to the UE. Whether a partial beam failure recovery procedure or a full beam failure recovery procedure is triggered is identified in response to the beam failure recovery request. A beam management procedure is triggered when the partial beam failure recovery procedure is triggered.

BRIEF DESCRIPTION OF THE DRAWINGS

Aspects of the exemplary disclosure are best understood from the following detailed description when read with the accompanying figures. Various features are not drawn to scale, dimensions of various features may be arbitrarily increased or reduced for clarity of discussion.

DETAILED DESCRIPTION

Figure 1:
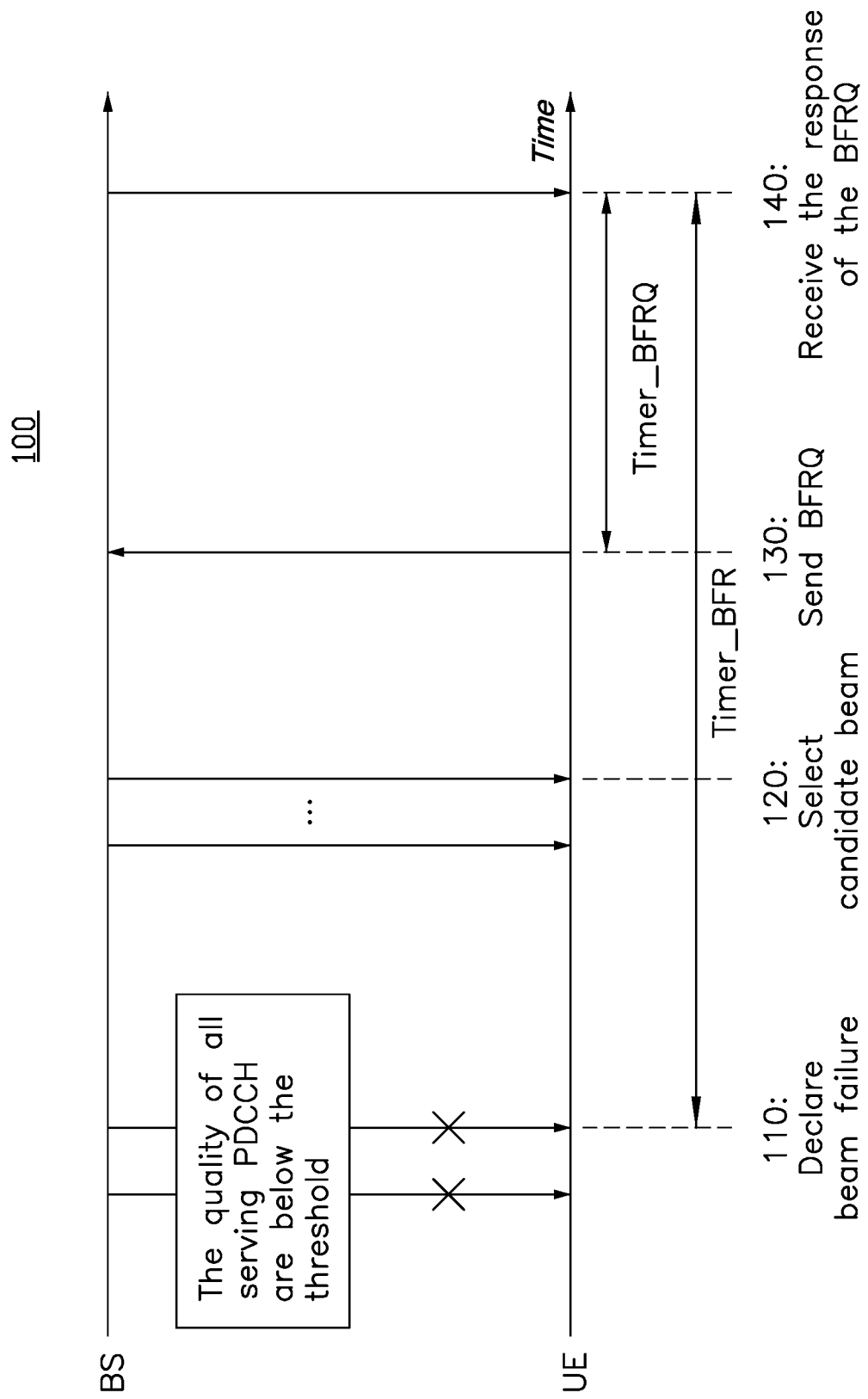
FIG. 1 is a schematic diagram of a beam failure recovery procedure in a wireless communication system according to an exemplary implementation of the present disclosure.

The following description contains specific information pertaining to exemplary implementations in the present disclosure. The drawings in the present disclosure and their accompanying detailed description are directed to merely exemplary implementations. However, the present disclosure is not limited to merely these exemplary implementations. Other variations and implementations of the present disclosure will occur to those skilled in the art. Unless noted otherwise, like or corresponding elements among the figures may be indicated by like or corresponding reference numerals. Moreover, the drawings and illustrations in the present disclosure are generally not to scale, and are not intended to correspond to actual relative dimensions.

For the purpose of consistency and ease of understanding, like features are identified (although, in some examples, not shown) by numerals in the exemplary figures. However, the features in different implementations may be differed in other respects, and thus shall not be narrowly confined to what is shown in the figures.

The description uses the phrases "in one implementation," or "in some implementations," which may each refer to one or more of the same or different implementations. The term "coupled" is defined as connected, whether directly or indirectly through intervening components, and is not necessarily limited to physical connections. The term "comprising," when utilized, means "including, but not necessarily limited to"; it specifically indicates open-ended inclusion or membership in the so-described combination, group, series and the equivalent. The term "design" means "configuration" but not necessarily limited to.

In the present disclosure, a base station may include, but is not limited to, a node B (NB) as in the Universal Mobile Telecommunication System (UMTS), as in the LTE-A, a radio network controller (RNC) as in the UMTS, a base station controller (BSC) as in the GSM (Global System for Mobile Communication)/GERAN (GSM EDGE Radio Access Network), a ng-eNB as in an Evolved Universal Terrestrial Radio Access (E-UTRA) base station in connection with the 5G Core Network (5GC), a next generation node B (gNB) as in the 5G Access Network (5G-AN), an RRH (Remote Radio Head), a TRP (transmission and reception point), a cell, and any other apparatus capable of controlling radio communication and managing radio resources within a cell. The base station may connect to serve one or more UE(s) through a radio interface to the network.

In the present disclosure, a UE may include, but is not limited to, a mobile station, a mobile terminal or device, and a user communication radio terminal. For example, a UE may be a portable radio equipment, which includes, but is not limited to, a mobile phone, a tablet, a wearable device, a sensor, a personal digital assistant (PDA) with wireless communication capability, and other wireless devices equipping with an LTE access module or an 5G NR (New Radio) access module. In the present disclosure, the UE is configured to communicate with a radio access network via the base station.

The UE or the base station may include, but is not limited to, a transceiver, a processor, a memory, and a variety of computer-readable media. The transceiver having transmitter and receiver configured to transmit and/or receive data. The processor may process data and instructions. The processor may include an intelligent hardware device, e.g., a central processing unit (CPU), a microcontroller, or an ASIC. The memory may store computer-readable, computer-executable instructions (e.g., software codes) that are configured to cause processor to perform various functions. The memory may include volatile and/or non-volatile memory. The memory may be removable, non-removable, or a combination thereof. Exemplary memories include solid-state memory, hard drives, optical-disc drives, and etc. The computer storage media stores information such as computer-readable instructions, data structures, program modules or other data. The computer-readable media can be any available media that can be accessed and include both volatile and non-volatile media, removable and non-removable media. By way of example, and not limitation, the computer-readable media may comprise computer storage media and communication media. The computer storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices.

FIG. 1 is a schematic diagram 100 of a beam failure recovery procedure in a wireless communication system according to an exemplary implementation of the present disclosure. The wireless communication system includes one or more UE(s) and one or more base station(s) (BS). The BS configures a control channel (e.g., physical downlink control channel (PDCCH)) for a UE to monitor for receiving downlink (DL) data via a control resource set (CORESET) configuration. The UE monitors the quality of all the serving PDCCH by measuring configured reference signals (RSs). A beam failure recovery procedure will be trigger when the quality of all the PDCCH are lower a threshold. In one implementation, the quality of the PDCCH is represented by a pre-configured synchronization signal (SS) block. In another implementation, the quality of the PDCCH is represented by a channel state information reference signal (CSI-RS). As shown in action 110, when the UE identifies that the quality of all the serving PDCCH are below a threshold, a beam failure is declared by the UE and therefore a beam failure recovery procedure is triggered.

In action 120, the UE monitors all the candidate RSs to and select a new qualified beam for recovery. In action 130, the UE sends a beam failure recovery request (BFRQ) to the BS. Afterwards, the UE monitors the response of BFRQ. In action 140, the UE receives the response of BFRQ.

To restrict the time and resource of the beam failure recovery procedure, there is a timer designed for beam failure (denoted as timer_BFR). The timer_BFR starts when a beam failure is declared (e.g., in action 110), and the timer_BFR stops when the UE successfully receive the response of the BFRQ (e.g., in action 140). If the UE cannot recover (e.g., complete the beam failure recovery procedure successfully) before the timer_BFR expires, the UE will consider the beam failure recovery procedure has already failed and stop the beam failure recovery procedure. Furthermore, there is another timer designed for monitoring the response of BFRQ (e.g., a beam-failure-recovery-request-timer, denoted as timer_BFRQ) to prevent the UE from waiting BFRQ for a long time. The timer_BFRQ starts when a BFRQ is sent (e.g., in action 130), and the timer_BFRQ stops when the UE successfully receive the response of the BFRQ (e.g., in action 140). If UE fails to receive the response of BFRQ before the timer_BFRQ expires, the UE will retransmit the BFRQ and keep monitoring the PDCCH. Once the timer_BFR expires or the UE reaches the maximum number of BFRQ transmission, the beam failure recovery procedure is considered failed. Thus, the UE will trigger an RLF procedure and start the RRC connection re-establishment.

Figure 2:
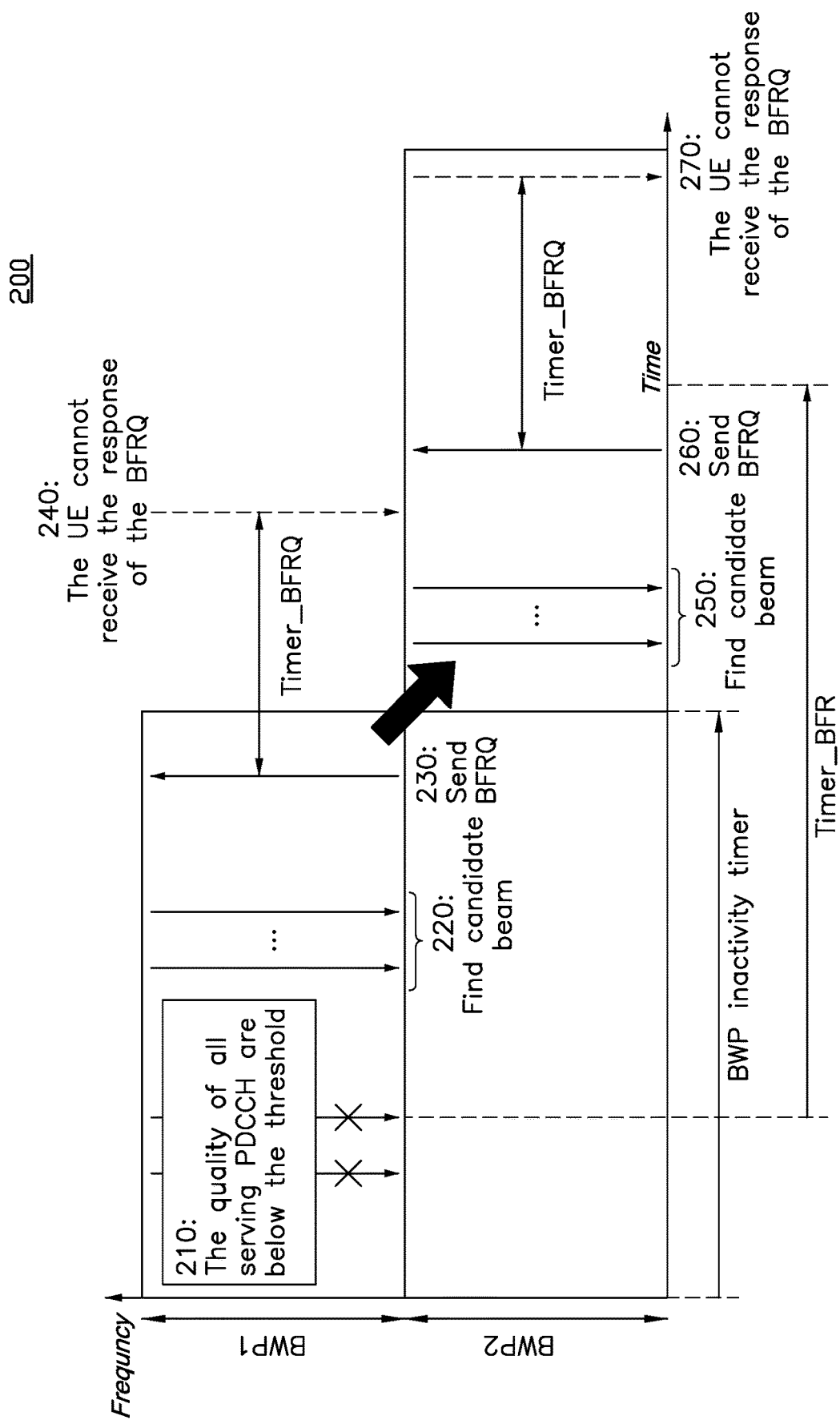
FIG. 2 is a schematic diagram illustrating a scenario of a beam failure recovery procedure performed in a wireless communication system with two BWP configurations according to an exemplary implementation of the present disclosure.

FIG. 2 is a schematic diagram 200 illustrating a scenario of a beam failure recovery procedure performed in a wireless communication system with two BWP configurations according to an exemplary implementation of the present disclosure. In one implementation, the UE is configured with multiple BWPs (e.g., a default BWP and others BWP). A timer (e.g., BWP inactivity timer) associates with the BWP configurations is configured by the BS. When the BWP inactivity timer expires, the UE switches from the active BWP to the default BWP.

As shown in FIG. 2, a beam failure recovery procedure is declared on the active BWP (e.g., BWP1) as shown in action 210, the UE finds the candidate beam on the active BWP (e.g., BWP1) as shown in action 220. After the candidate beam is selected by the UE, the beam failure recovery procedure is triggered by sending a BFRQ on the active BWP (e.g., BWP1) to the BS as shown in action 230. However, in some implementations, the BWP inactivity timer expires before receiving the response of BFRQ, and thus the UE switches from the active BWP (e.g., BWP1) to the default BWP (e.g., BWP2). As such, the UE cannot receive the response of the BFRQ on the active BWP (e.g., BWP1) from the BS (as shown in indication 240) since the UE is configured to monitor the CORESET on the current active BWP (e.g., BWP2 after the BWP inactivity timer expires). Therefore, the beam failure recovery procedure will be interrupted by the switching of the BWP, and the UE will be unable to receive the response of BFRQ even if the timer for the response of BFRQ has not yet expired.

After switching to the default BWP, the UE measures all the beam qualities to find the candidate beam in action 250, and sends a BFRQ on the current active BWP (e.g., the default BWP, BWP2) in action 260, and then monitors the response of the BFRQ on the current active BWP (e.g., the default BWP2). This leads to additional latency and overhead since the UE has to measure all the beam qualities to find the candidate beam even if a qualified beam is selected on the previous active BWP. Furthermore, the remaining time of timer_BFR may not be enough for the UE to complete the beam failure recovery procedure. For instance, the timer_BFR may expire before the UE receives the response of the BFRQ (as shown in indication 270) and the beam failure recovery procedure is stopped. To alleviate the influence of the switching of the BWP operation on the beam failure recovery procedure, several new designs of the beam failure recovery procedure is proposed.

Figure 3:
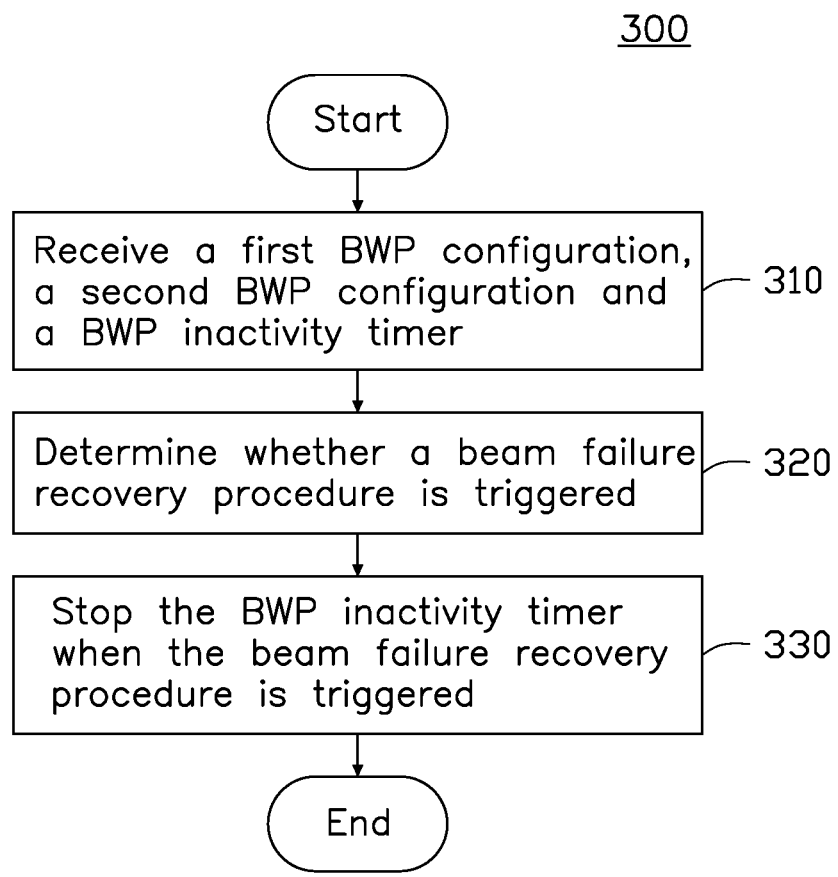
FIG. 3 is a flowchart of a method for beam failure recovery procedure in a wireless communication system according to an exemplary implementation of the present disclosure.

FIG. 3 is a flowchart 300 of a method for beam failure recovery procedure in a wireless communication system according to an exemplary implementation of the present disclosure. The method includes the following actions. In action 310, a first BWP configuration, a second BWP configuration and a BWP inactivity timer are received from a base station by a UE. The UE is configured to be switched from a first BWP to a second BWP when the BWP inactivity timer expires, where the first BWP corresponds to the first BWP configuration and the second BWP corresponds to the second BWP configuration. In action 320, whether a beam failure recovery procedure is triggered is determined by the UE. In action 330, the BWP inactivity timer is stopped by the UE when the beam failure recovery procedure is triggered.

In one implementation, when the beam failure recovery procedure is triggered, the UE transmits a BFRQ to the BS and monitors a beam failure recovery response. In some implementations, the BWP inactivity timer starts (e.g., continues or restarted) when the beam failure recovery response is received successfully.

In one implementation, a BFRQ may be transmitted via a contention-free random-access channel (RACH) (e.g., a beam-failure-recovery-request-RACH-resource). In another implementation, each BWP will have its own PUCCH resource configuration, and the BFRQ may be transmitted via a physical uplink control channel (PUCCH).

In some implementations, separate CORESETs for the beam failure recovery procedure are configured for both the active BWP and the default BWP. For example, each BWP configuration further includes a beam failure recovery configuration, and the beam failure recovery configuration is associated with a CORESET. After the UE sends the BFRQ to the BS, the UE monitors the response of the BFRQ in the pre-configured CORESET on the PDCCH on the corresponding BWP. The CORESET configuration may be sent via the RRC signaling when the UE switches between the BWPs. The CORESET configuration includes a time duration, a frequency domain resources (e.g., the distance between the $0^{th}$ physical resource block (PRB) within a BWP and the reference location) and a starting OFDM symbol.

In some other implementations, only one CORESET configuration is configured for the active BWP, and the UE monitors the CORESET configuration of the remaining minimum system information (RMSI) when the UE switches to the default BWP during the beam failure recovery procedure. The UE has to measure all the SS blocks on the default BWP to find the qualified beam. Afterwards, the UE finds the scheduling information for the CORESET configuration of the RMSI and monitors the CORESET to receive the response of BFRQ.

In some other implementations, the CORESET configuration is configured only for the default BWP. The scheduling information of the CORESET configuration for the other BWPs are implicitly indicated by the BS via the scheduling information of the CORESET configuration on the default BWP. For example, the default BWP and the other BWPs may apply different resource block group (RBG) sizes so that the UE may obtain the scheduling information for the other BWP according to the time domain scheduling information and frequency domain scheduling information on the default BWP and the RBG sizes and frequency domain start points on the default BWP.

Figure 4:
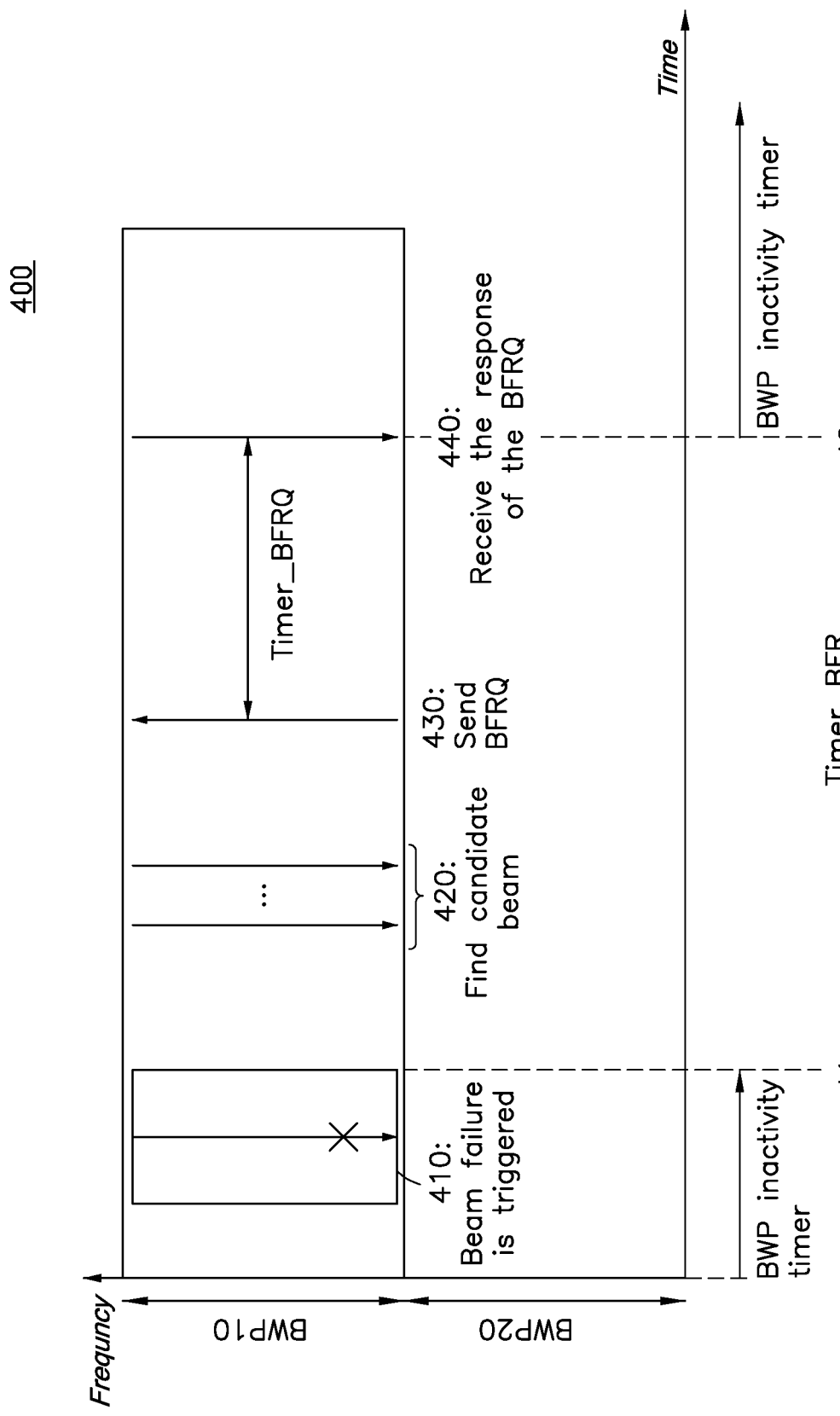
FIG. 4 is a schematic diagram of a method for beam failure recovery procedure in a wireless communication system according to an exemplary implementation of the present disclosure.

FIG. 4 is a schematic diagram 400 of a method for beam failure recovery procedure in a wireless communication system according to an exemplary implementation of the present disclosure. In this implementation, a first BWP (e.g., BWP10) is the current active BWP, and a second BWP (e.g., BWP20) is configured as the default BWP. The method includes the following actions. In action 410, a beam failure is declared and a beam failure recovery is triggered on the active BWP (e.g., BWP10). Meanwhile, the BWP inactivity timer stops when the beam failure recovery is triggered at a time point (e.g., t1). In action 420, the UE performs measurements to find the qualified beam a beam on the active BWP (e.g., BWP10). In action 430, the UE sends a BFRQ to the BS on the active BWP (e.g., BWP10). In action 440, the UE receives the response of the BFRQ (e.g., the beam failure recovery response) from the BS on the active BWP (e.g., BWP10). Thus, the BWP inactivity timer starts when the beam failure recovery response is received at a time point (e.g., t2).

In this implementation, since the BWP inactivity timer stops when the beam failure recovery is triggered, the UE will not switch to the default BWP (e.g., BWP20). That is, the UE will stay on the active BWP (e.g., BWP10) until the beam failure recovery procedure is completed (i.e., successfully receive the beam failure recovery response from the BS).

In some implementations, during selecting the candidate beam, the UE decides whether to reset the timer_BFR according to the quality of candidate beam (e.g., via measuring the RS). For instance, if the quality of the measured RS exceeds the threshold, the UE reset the timer_BFR so that the there is enough time for completing the beam failure recovery procedure and thus the opportunity of successful beam failure recovery is increased. In one implementation, the threshold is configured by an RRC signaling together with a beam recovery configuration.

It is noted that, in some implementations, the method is performed on an unpaired spectrum, where a downlink (DL) BWP and an uplink (UL) BWP are jointly configured as a BWP pair. In some other implementations, the method is performed on a paired spectrum, where a DL BWP and a UL BWP are configured separately and independently.

Figure 5:
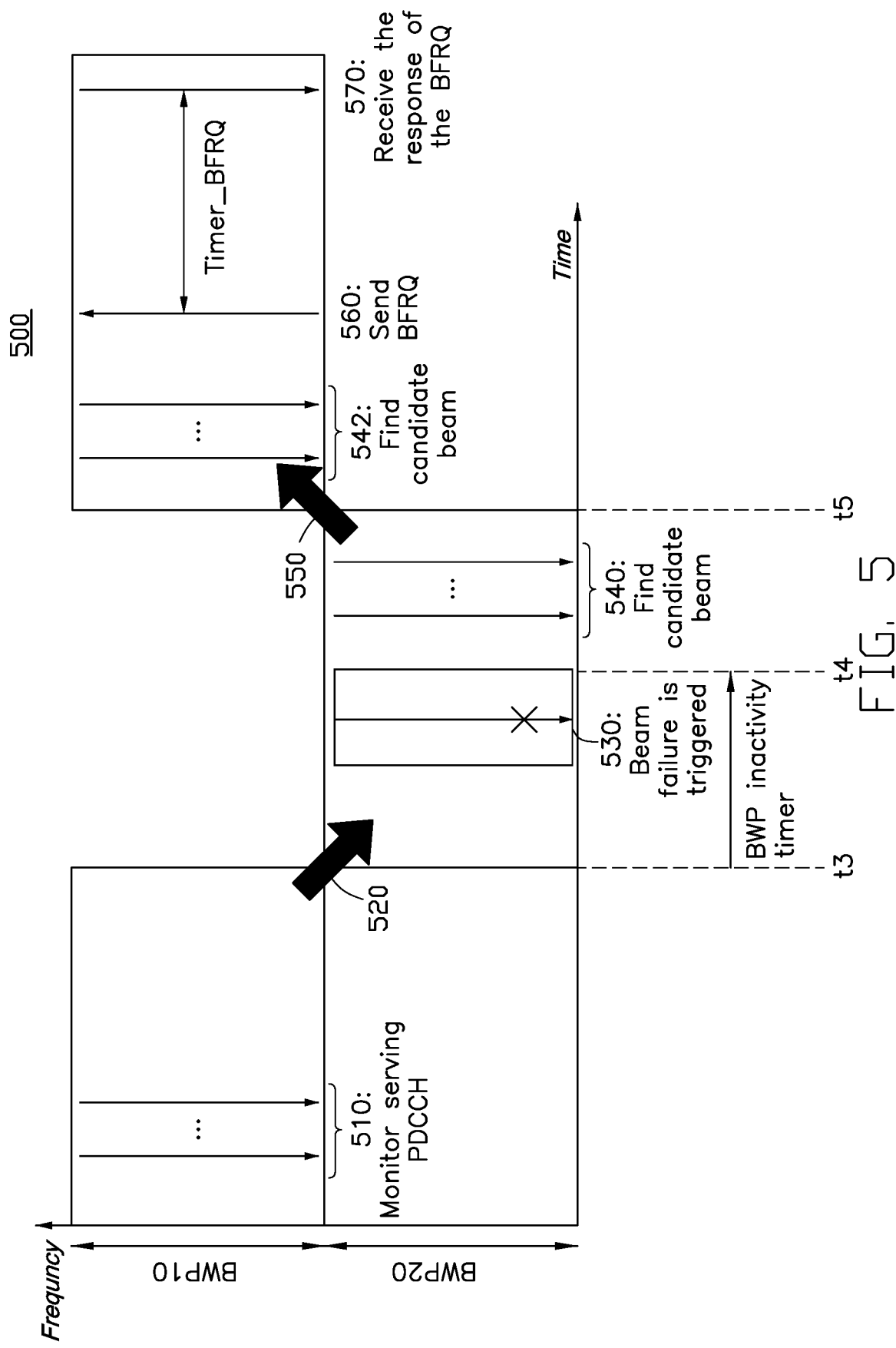
FIG. 5 is a schematic diagram of a method for beam failure recovery procedure in a wireless communication system according to an exemplary implementation of the present disclosure.

FIG. 5 is a schematic diagram 500 of a method for beam failure recovery procedure in a wireless communication system according to an exemplary implementation of the present disclosure. In this implementation, a first BWP (e.g., BWP12) is the initial active BWP. In action 510, the UE monitors the serving PDCCH on the initial active BWP12. In action 520, the UE switches from the initial active BWP (e.g., BWP12) to a second BWP (e.g., BWP22). In one implementation, the second BWP (e.g., BWP22) is configured as the new default BWP due to a service requirement (e.g., a low latency) or a transmission scenario constraint (e.g., on a high speed train), and the UE switches to the BWP22 by DCI configured by the BS. In another implementation, the UE switches from the initial active BWP (e.g., BWP12) to the second BWP (e.g., BWP22) when the UE receives a switching command configured by the BS.

After the UE switches from the initial active BWP (e.g., BWP12) to the default BWP (e.g., BWP22) at a time point (e.g., t3), the UE monitors the serving PDCCH on the default BWP (e.g., BWP22). In action 530, a beam failure is declared and the beam failure recovery procedure is triggered on the default BWP 22, and the BWP inactivity timer stops at a time point (e.g., t4).

Since the BWP (e.g., BWP22) is configured as the new default BWP, the UE will switch to the default BWP (e.g., BWP22) when the BWP inactivity timer expires. However, in some implementations, the UE may attempt to trigger the beam failure recovery procedure on the initial active BWP (e.g., BWP12). In one implementation, the UE triggers the beam failure recovery procedure on the initial active BWP (e.g., BWP12) because the quality of the channel quality on the initial active BWP is better. In another implementation, the UE triggers the beam failure recovery procedure on the initial active BWP 12 due to the power consumption of the procedure performed on the default BWP is larger.

For instance, the UE may retain all the setting of initial active BWP after the second BWP (e.g., BWP22) is configured as the new default BWP. Once the UE decides to trigger the beam failure recovery procedure on the initial active BWP (e.g., BWP12), the UE regards the initial active BWP (e.g., BWP12) as the new active BWP and switches from the default BWP (e.g., BWP22) to the initial active BWP (e.g., BWP12) at a time point (e.g., t5) as shown in action 550.

In one implementation, the UE finds the candidate beam on the default BWP (e.g., BWP22) as shown in action 540. In another implementation, the UE finds the candidate beam on the initial active BWP (e.g., BWP12) as shown in action 542. In some other implementations, the UE is configured with at least two CORESET configurations associated with the beam failure recovery for the default BWP and the initial active BWP, respectively. Therefore, the UE finds the candidate beam on both the default BWP (e.g., BWP22) and the initial active BWP (e.g., BWP12) as shown in actions 540 and 542.

Afterwards, the UE will send a BFRQ to the BS on the initial active BWP 12 in action 560, and monitor the response of the BFRQ on the initial active BWP 12 and stay on the initial active BWP 12 until the timer_BFRQ expires. In one implementation, the UE keeps staying on the initial active BWP. After the timer_BFRQ expires, the UE will send the BFRQ again and monitor the preconfigured CORESET configuration associated with the beam failure recovery for the initial active BWP until the timer_BFR expires.

It is noted that, in some implementations, the method is performed on an unpaired spectrum, where a downlink (DL) BWP and an uplink (UL) BWP are jointly configured as a BWP pair. In some other implementations, the method is performed on a paired spectrum, where a DL BWP and a UL BWP are configured separately and independently. In some implementations, the BFRQ may contain some information such as a BWP index, a candidate RSs index or a CORESET configuration order index indicating the BWP monitored by the UE for the response of BFRQ. Therefore, in action 570, the BS transmits the response of BFRQ to the UE on the initial active BWP 1.

Figure 6:
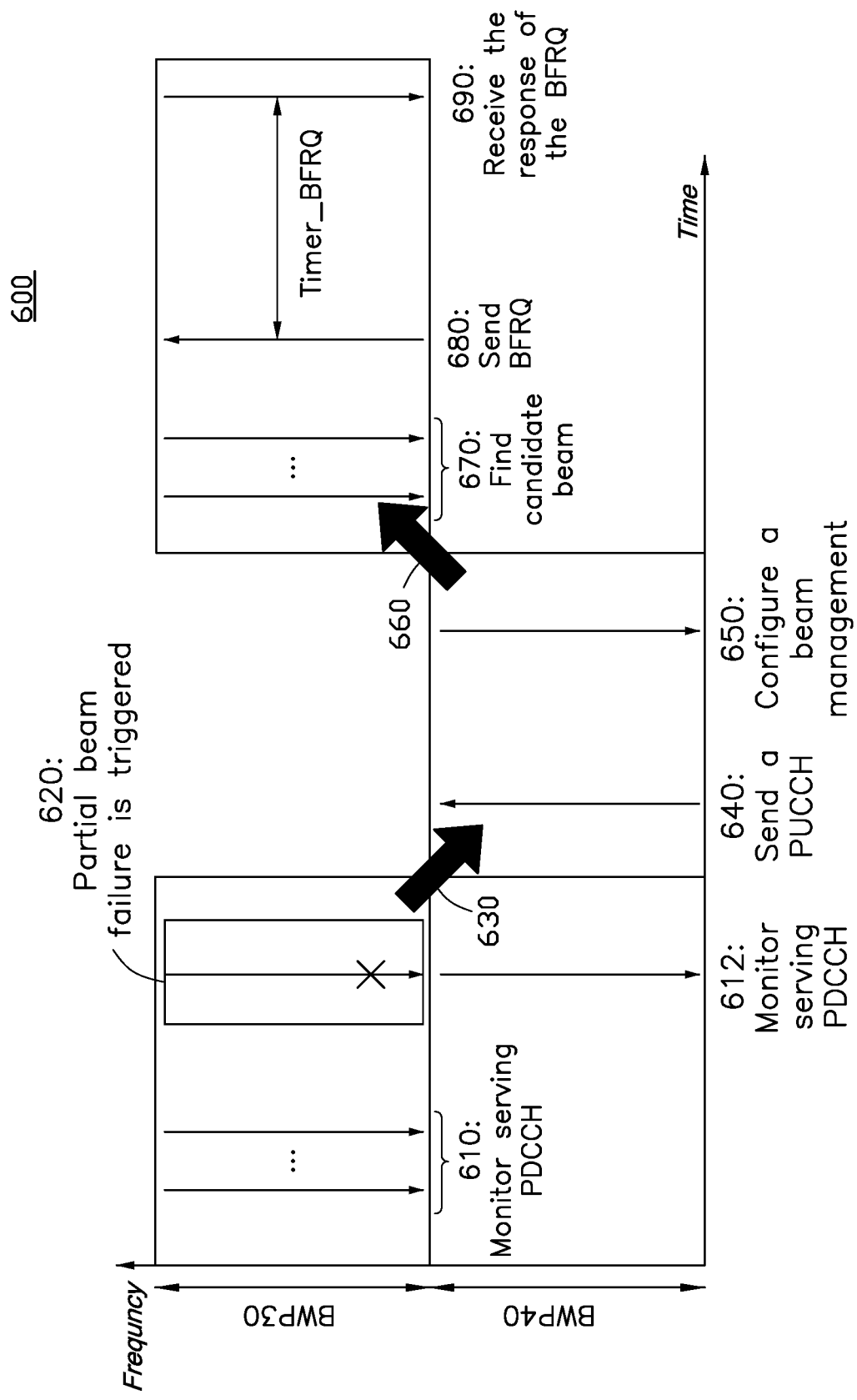
FIG. 6 is a schematic diagram of a method for beam failure recovery procedure in a wireless communication system according to an exemplary implementation of the present disclosure.

FIG. 6 is a schematic diagram 600 of a method for beam failure recovery procedure in a wireless communication system according to an exemplary implementation of the present disclosure. In this implementation, a first BWP (e.g., BWP30) is the current active BWP, and a second BWP (e.g., BWP40) is configured as the default BWP, and both the current active BWP (e.g., BWP30) and the default BWP (e.g., BWP40) are deemed as the serving PDCCH. That is, the UE monitors the quality of the serving PDCCH on the current active BWP (e.g., BWP30) and the default BWP (e.g., BWP40). For example, in action 610, the UE monitors the serving PDCCH on the current active BWP (e.g., BWP30). In action 612, the UE monitors the serving PDCCH on the default BWP (e.g., BWP40). In some implementations, the UE keeps measuring the serving PDCCH on the default BWP if the BS configures an inter BWP measurement for the UE.

In action 620, a partial beam failure procedure is triggered on the current active BWP (e.g., BWP30). For example, when the quality of only a partial but not all PDCCHs is below the threshold for a period, the partial beam failure recovery (PBFR) procedure is triggered. In some implementations, a beam failure recovery procedure or a full beam failure recovery (FBFR) procedure is triggered when the quality of all serving PDCCHs are below the threshold for a period. In some other implementations, a full beam failure recovery procedure (FBFR) will not be triggered if the quality of PDCCH on default BWP (e.g., BWP40) still fulfills the requirement of the beam operation.

In action 630, the UE switches back to the default BWP (e.g., BWP40) after the PBFR procedure is triggered. In action 640, the UE sends a PUCCH on the default BWP (e.g., BWP40) to the BS. When the BS receives the PUCCH on the default BWP (e.g., BWP40) before the BWP inactivity timer expires, the BS identifies that the PBFR procedure is triggered on the current active BWP (e.g., BWP30).

In action 650, the BS configures a beam management on the default BWP (e.g., BWP40). In this implementation, the BS configures UE to perform measurements to find the new candidate beam and monitors the response of BFRQ on the first BWP (e.g., BWP30). Therefore, in action 660, the UE switches to the first BWP (e.g., BWP30). In action 670, the UE finds the new candidate beam on the BWP where the PBFR is triggered (e.g., BWP30). In action 680, the UE sends a BFRQ to the BS and then monitors the response of BFRQ. In action 690, the UE receives the response of the BFRQ.

In one implementation, different beams are used on the first BWP (e.g., BWP30) and the second BWP (e.g., BWP40). Therefore, after the BS receives a PUCCH, the BS configures the UE to find the candidate beam on the first BWP (e.g., BWP30), where the PBFR is declared. In some implementations, the BS triggers an aperiodic beam management procedure according to the previous transmission. In some implementations, the BS triggers an aperiodic beam management procedure according to a UE measurement reports.

In some other implementations, the BWP where the UE performs measurements and monitors the response of BFRQ is configured by the UE. For instance, the UE may attempt to find the new candidate beam and monitor the response of BFRQ on the active BWP by default. However, in some implementations, when the CORESET configuration for the UE is not allocated by the BS, the UE chooses another BWP to monitor the CORESET configuration. In some other implementations, the UE chooses another BWP due to the subcarrier spacing (SCS) of the active BWP is larger. In some other implementations, the UE chooses another BWP since the bandwidth (BW) of the active BWP is larger.

During the PBFR procedure, since the UE sends a PUCCH to the BS after switching back to the default BWP, the UE does not need to monitor the PDCCH on the default BWP and wait for the BWP inactivity timer expires, the latency may be reduced. Furthermore, since the UE sends a PUCCH to inform the BS that the PBFR procedure is triggered and then the BS triggers the beam management procedure according to the previous transmission or measurement, the UE does not need to find the new candidate beam by monitoring periodic RSs. Therefore, by using the PBFR procedure, the resource and the latency may be reduced.

To notify the BS that the UE has already switched back to the default BWP, the UE uses a PUCCH for the beam failure recovery procedure. In one implementation, an implicit way is to use a location of the PUCCH resource for BFR since each BWP are configured with a corresponding PUCCH resource. For example, when a partial beam failure is declared, e.g., the quality of the PDCCH of only one BWP (i.e., the active BWP) is below a threshold for a period, the UE switches back to the default BWP immediately and uses the pre-configured PUCCH resource of the default BWP with qualified beam to send a BFRQ, and then the BS triggers the aperiodic beam management to find new candidate beam on the active BWP. On the other hand, when a full beam failure is declared, e.g., the quality of the PDCCH of both the active BWP and the default BWP are below the threshold for a period, the UE performs the FBFR procedure on the active BWP until the BWP inactivity timer expires. Therefore, the BS identifies that the PBFR is triggered when a PUCCH resource for the beam failure recovery procedure is received on the inactive BWP (i.e., the default BWP).

In another implementation, an explicit way is to use an uplink control information (UCI) associated with the beam measurement results. The PUCCH includes a BWP indication, e.g., a BWP index, BWP information, a beam information associated with the BWP (if different beams are applied for each BWP). For example, when a partial beam failure is declared on the first BWP, the UE sends the BWP index of the first BWP via a PUCCH with a new candidate beam information for the first BWP. On the other hand, when a full beam failure is declared on the first BWP and the second BWP, the UE sends the BWP index of the first BWP and the BWP index of the second BWP via a PUCCH with a new candidate beam information for the first BWP or a new candidate beam information for the second BWP. In some implementations, when a full beam failure is declared, a PUCCH is transmitted to the BS without any BWP information. Hence, upon receiving the PUCCH, the BS determines which type of the beam failure recovery procedure is triggered.

It is noted that the UE may choose to send the UCI with the PUCCH resource of any BWP, and the BS may identify the BWP where the beam failure is declared according to the BWP index. In some implementations, the UE sends a bit indicator to the BS indicating the BWP where the UE monitors the response of BFRQ, for instance, "0" stands for the PDCCH on the default BWP, and "1" stands for the PDCCH on the current active BWP.

In another implementation, to notify the BS that the UE has already switch back to the default BWP, the UE uses a contention-free random access (CFRA) procedure for the beam failure recovery procedure. An implicit way is to use a location of the RACH resource for the beam failure recovery procedure since each BWP are configured with a corresponding RACH resource. For example, when a partial beam failure is declared, the UE switches back to the default BWP immediately and uses the pre-configured RACH resource of the default BWP with qualified beam to send a BFRQ, and then the BS triggers the aperiodic beam management to find new candidate beam on the active BWP. On the other hand, when a full beam failure is declared, the UE performs the FBFR procedure on the active BWP until the BWP inactivity timer expires. Therefore, the BS identifies that the PBFR is triggered when a RACH resource for the beam failure recovery procedure is received on the inactive BWP (i.e., the default BWP).

In another implementation, an explicit way is to use a contention-free beam failure recovery (BFR) preamble. Some preamble IDs are reserved for the contention-free BFR. For example, the BS identifies a beam failure is declared upon receiving the MSG1 containing the BFR preamble. These preamble IDs may be further categorized into two groups, where one group (e.g., preamble IDs 60 and 61) represents the PBFR procedure and the other group (e.g., preamble IDs 62 and 63) represents the FBFR procedure. When a partial beam failure is declared on the first BWP, the UE sends a MSG1 containing a BFR preamble ID (e.g., preamble ID 60) associated with a new candidate beam information for the first BWP. On the other hand, when a full beam failure is declared on the first BWP and the second BWP, the UE sends a MSG1 containing a BFR preamble ID (e.g., preamble ID 62) associated with a new candidate beam information for the first BWP or a new candidate beam information for the second BWP. Hence, upon receiving the RACH, the BS determines which type of the beam failure recovery procedure is triggered according to the BFR preamble. It is noted that the UE may choose to send the corresponding preamble IDs with the RACH resource of any BWP, and the BS may identify the BWP where the beam failure is declared according to the BFR preamble.

Figure 7:
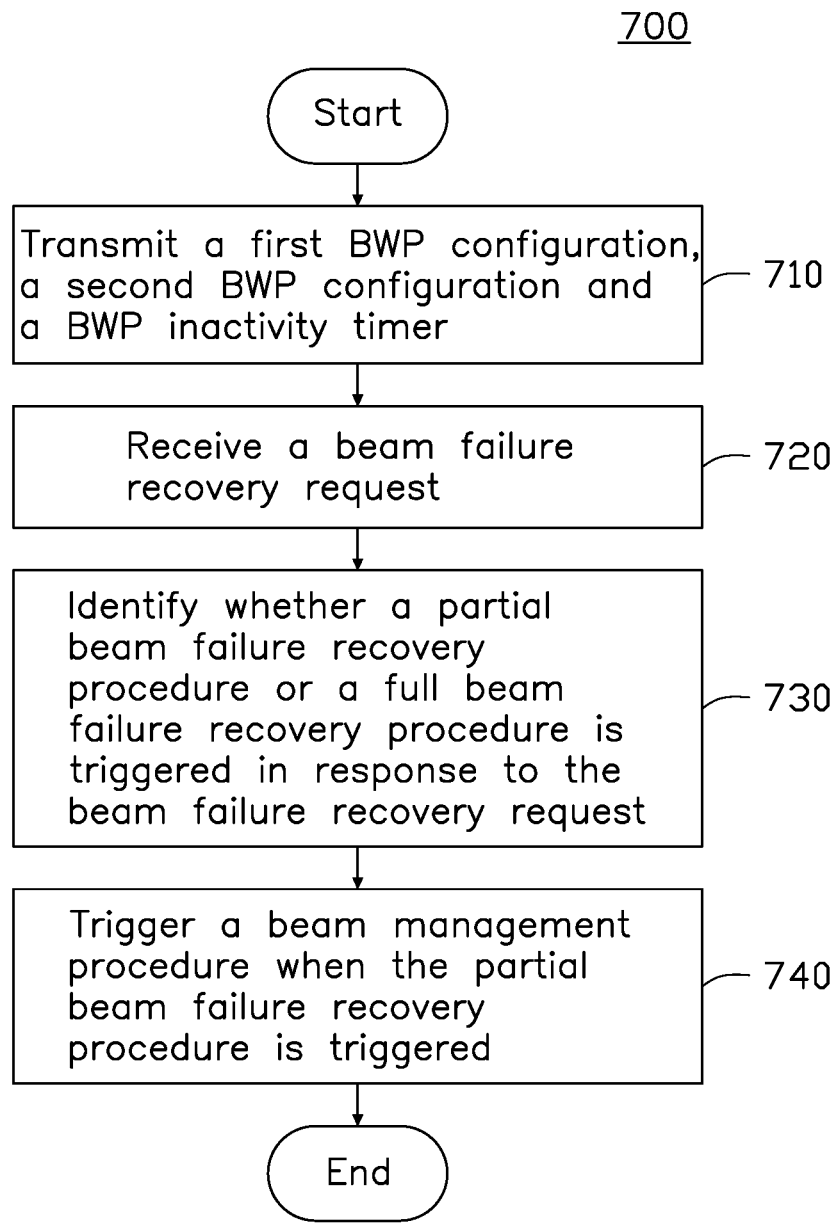
FIG. 7 is a flowchart of a method for beam failure recovery procedure in a wireless communication system according to an exemplary implementation of the present disclosure.

FIG. 7 is a flowchart 700 of a method for beam failure recovery procedure in a wireless communication system according to an exemplary implementation of the present disclosure. The method includes the following actions. In action 710, a first BWP configuration, a second BWP configuration and a BWP inactivity timer are transmitted to the UE by a BS. In action 720, a beam failure recovery request is received from the UE. In action 730, whether a partial beam failure recovery procedure or a full beam failure recovery procedure is triggered is identified by the BS according to the beam failure recovery request. In action 740, a beam management procedure is triggered when the partial beam failure recovery procedure is triggered.

From the above description it is manifested that various techniques may be used for implementing the concepts described in the present application without departing from the scope of those concepts. Moreover, while the concepts have been described with specific reference to certain implementations, a person of ordinary skill in the art would recognize that changes may be made in form and detail without departing from the scope of those concepts. As such, the described implementations are to be considered in all respects as illustrative and not restrictive. It should also be understood that the present application is not limited to the particular implementations described above, but many rearrangements, modifications, and substitutions are possible without departing from the scope of the present disclosure.

What is claimed is:

1. A method for a UE to perform beam failure recovery (BFR) in a wireless communication system, the method comprising:
   transmitting a first BFR request;
   receiving a first BFR response;
   if the first BFR response is monitored on a BFR physical downlink control channel (PDCCH) configured by a BFR PDCCH monitoring configuration and the first BFR response is successfully received, determining the BFR is successful;
   stopping a timer for beam failure;
   receiving a first bandwidth part (BWP) configuration corresponding to a first BWP, a second BWP configuration corresponding to a second BWP, and a BWP inactivity timer from a base station (BS);
   determining whether a BFR procedure is triggered; and
   stopping the BWP inactivity timer in response to the BFR procedure being triggered,
   wherein the UE is configured to be switched from the first BWP to the second BWP in response to the BWP inactivity timer being expired.

2. The method of claim 1, wherein the first BWP configuration includes a BFR configuration associated with a control resource set.

3. The method of claim 1, further comprising:
   switching from an initial active BWP to a current active BWP in response to receiving a switching command configured by the BS,
   wherein the initial active BWP corresponds to the second BWP configuration and the current active BWP corresponds to the first BWP configuration.

4. The method of claim 3, comprising:
   determining that the BFR procedure is triggered;
   performing transmissions on the current active BWP;
   switching from the current active BWP to the initial active BWP;
   transmitting a second BFR request to the BS on the initial active BWP; and
   monitoring a second BFR response from the BS on the initial active BWP.

5. The method of claim 1, wherein the BFR procedure is a partial BFR procedure and the method further comprises triggering the partial BFR procedure in response to a quality of a PDCCH being below a threshold.

6. The method of claim 5, further comprising:
   switching from the first BWP to the second BWP in response to a quality of the PDCCH on the first BWP being below the threshold;
   transmitting a partial BFR request to the BS; and
   monitoring a partial BFR response from the BS.

7. The method of claim 6, wherein the partial BFR request is transmitted via a physical uplink control channel (PUCCH).

8. The method of claim 6, wherein the partial BFR request is transmitted via a random access channel (RACH).

9. The method of claim 6, wherein the partial BFR request is transmitted on the second BWP.

10. A user equipment (UE), comprising:
    a processor configured to perform instructions for:
    transmitting a first BFR request;
    receiving a first BFR response;
    if the first BFR response is monitored on a BFR physical downlink control channel (PDCCH) configured by a BFR PDCCH monitoring configuration and the first BFR response is successfully received, determining the BFR is successful;
    stopping a timer for beam failure;
    receiving a first bandwidth part (BWP) configuration corresponding to a first BWP, a second BWP configuration corresponding to a second BWP, and a BWP inactivity timer from a base station (BS);
    determining whether a BFR procedure is triggered; and
    stopping the BWP inactivity timer in response to the BFR procedure being triggered,
    wherein the UE is configured to be switched from the first BWP to the second BWP in response to the BWP inactivity timer being expired.

11. The UE of claim 10, wherein the first BWP configuration includes a BFR configuration associated with a control resource set.

12. The UE of claim 10, wherein the processor is further configured to perform instructions for:
    switching from an initial active BWP to a current active BWP in response to receiving a switching command configured by the BS, wherein
    the initial active BWP corresponds to the second BWP configuration and the current active BWP corresponds to the first BWP configuration.

13. The UE of claim 12, wherein the processor is further configured to perform instructions for:
    determining that the BFR procedure is triggered;
    performing transmissions on the current active BWP;
    switching from the current active BWP to the initial active BWP;
    transmitting a second BFR request to the BS on the initial active BWP; and
    monitoring a second BFR response from the BS on the initial active BWP.

14. The UE of claim 10, wherein the BFR procedure is a partial BFR procedure, the processor is further configured to perform instructions for:
    triggering the partial BFR procedure in response to a quality of a PDCCH being below a threshold.

15. The UE of claim 14, the processor is further configured to perform instructions for:

switching from the first BWP to the second BWP in response to a quality of the PDCCH on the first BWP being below the threshold;
transmitting a partial BFR request to the BS; and
monitoring a partial BFR response from the BS.

16. The UE of claim 15, wherein the partial BFR request is transmitted via a physical uplink control channel (PUCCH).

17. The UE of claim 15, wherein the partial BFR request is transmitted via a random access channel (RACH).

18. The UE of claim 15, wherein the partial BFR request is transmitted on the second BWP.

19. A method for a base station (BS) to perform beam failure recovery (BFR) in a wireless communication system, the method comprising:
  transmitting a first bandwidth part (BWP) configuration, a second BWP configuration and a BWP inactivity timer to a user equipment (UE);
  receiving a BFR request from the UE;
  identifying whether a partial BFR procedure or a full BFR procedure is triggered in response to the BFR request; and
  triggering a beam management procedure in response to the partial BFR procedure being triggered, wherein:
  the first BWP configuration includes a BFR configuration associated with a control resource set; and
  the BFR request is transmitted via a random access channel (RACH), and whether the partial BFR procedure or the full BFR procedure is triggered is identified according to a BFR preamble.

20. A base station (BS), comprising:
  a processor configured to perform instructions for:
  transmitting a first bandwidth part (BWP) configuration, a second BWP configuration and a BWP inactivity timer to a user equipment (UE);
  receiving a beam failure recovery (BFR) request from the UE;
  identifying whether a partial BFR procedure or a full BFR procedure is triggered in response to the BFR request; and
  triggering a beam management procedure in response to the partial BFR procedure being triggered, wherein:
  the first BWP configuration includes a BFR configuration, and the BFR configuration is associated with a control resource set; and
  the BFR request is transmitted via a random access channel (RACH), and the BS identifies whether the partial BFR procedure or the full BFR procedure is triggered according to a BFR preamble.

* * * * *